United States Patent [19]
Jones

[11] Patent Number: 4,981,208
[45] Date of Patent: Jan. 1, 1991

[54] MAGNETIC DRIVE SPIRAL CONVEYOR SYSTEM

[75] Inventor: Garland W. Jones, East New Market, Md.

[73] Assignee: The Cambridge Wire Cloth Company, Cambridge, Md.

[21] Appl. No.: 480,835

[22] Filed: Feb. 16, 1990

[51] Int. Cl.⁵ ............................................. B65G 21/18
[52] U.S. Cl. ..................................... 198/778; 198/805
[58] Field of Search ............................... 198/778, 805

[56] References Cited

U.S. PATENT DOCUMENTS

| | | | |
|---|---|---|---|
| 3,348,659 | 10/1967 | Roinestad | 198/778 |
| 4,078,655 | 3/1978 | Roinestad | |
| 4,557,374 | 10/1985 | Bode | |
| 4,643,298 | 2/1987 | Wallaart | |
| 4,741,430 | 5/1988 | Roinestad | 198/778 |
| 4,742,906 | 5/1988 | Wallaart | |
| 4,805,764 | 2/1989 | Zijderveld, Jr. | |
| 4,823,939 | 4/1989 | Langhans et al. | 198/805 |
| 4,852,720 | 8/1989 | Roinestad | 198/778 |
| 4,867,301 | 9/1989 | Roinestad et al. | 198/778 X |

FOREIGN PATENT DOCUMENTS

846434 10/1979 U.S.S.R. .

Primary Examiner—H. Grant Skaggs
Assistant Examiner—D. Glenn Dayoan
Attorney, Agent, or Firm—Cushman, Darby & Cushman

[57] ABSTRACT

A spiral conveyor system utilizing an endless flat belt is disclosed. The belt travels in an endless path which includes a spiral portion. The belt is primarily driven in the spiral portion by a frictional engagement between the belt and a rotating driving element. The frictional engagement results from a combination of a tension induced in the belt by a secondary drive and a magnetic force between the rotating driving element and the belt.

23 Claims, 9 Drawing Sheets

MAGNETIC DRIVE SPIRAL CONVEYOR SYSTEM

FIELD OF THE INVENTION

This invention relates to endless conveyor belt systems and in particular to endless conveyor belt systems driven in a spiral path.

BACKGROUND OF THE INVENTION

Conveyor systems in which conveyor belts are driven in a spiral path with the belt curving edgewise around a series of vertically spaced loops are commonly used to provide a great length of endless conveyor belt in a relatively small space. One conveyor system of this type is disclosed in U.S. Pat. No. 3,348,659 wherein tension is induced in the spiral belt so that there is frictional contact between the radially inner edge of the belt and a plurality of driving elements. This belt system is then frictionally driven by the driving elements which slidingly engage the radially inner edge of the spiral belt loops. The driving elements move faster than the belt and continuously slide past the belt edge to achieve a frictional drive. When safe operating parameters are exceeded for this type of system, the belt is subjected to excessively high tension which can result in inordinate wear and fatigue failure of the belt, as well as causing damage to the conveyor structure. Moreover, such operation can cause surging of the belt which interferes with its smooth operation and disturbs the products being conveyed.

Another conveyor system of this type is disclosed in U.S. Pat. No. 4,741,430. This system uses a positive drive to propel the belt. The drive includes a cylindrical cage rotatable about a vertical axis and having a plurality of vertical driving bars spaced circumferentially around the cage. The bars have radial driving surfaces arranged in overlapping and abutting relationship with protrusions which are spaced along the radially inner edge of the belt in the spiral loops so as to positively drive the belt.

Positive drive spiral belt systems suffer certain drawbacks. Engagement of the driving surface with the belt surface is difficult to initiate and maintain smoothly. The pitch of the belt changes as the belt enters and leaves the series of spiral loops. This changing pitch can not be compensated for by the drive mechanism. Thus, as belt pitch increases, driving contact is lost allowing the belt to become slack and migrate backward. A decrease in belt pitch causes the belt tension to increase resulting in belt surging, increased wear, fatigue failure and other damage to the system. Such disadvantages are overcome by the present invention.

SUMMARY OF THE INVENTION

The invention is directed to a spiral conveyor system which comprises an endless flat belt having a plurality of modular links connected together and adapted to collapse and expand, respectively, on opposite sides of the belt to permit passage of the belt around lateral curves. Means are provided to support the belt for passage through an endless path having a vertically oriented spiral portion, the spiral including an approach portion leading into a first loop at the lower end of the spiral and an exit portion leading away from the last loop at the upper end of the spiral.

Primary drive is accomplished by supplementing a conventional frictional drive with a drive system utilizing magnetic force. A conventional frictional drive is provided wherein tension is induced into the spiral belt such that there is frictional contact between the radially inner edge of the belt and the driving elements, as discussed earlier in reference to U.S. Pat. No. 3,348,659. In a preferred embodiment, the conveyor belt is a modular plastic belt such as is disclosed in U.S. Pat. No. 4,557,374. A cavity is molded into the exposed edge of each belt module which frictionally contacts the driving elements. Each cavity houses a magnet. The magnets embedded in the plastic belt are attracted to the steel bars of the rotating cage. The magnetic force between the magnets and the steel bars increases the contact pressure between the belt edge and drive bars, thereby increasing the drive force without increasing the belt edge tension. The rotating cage is driven by conventional means, and a conventional take-up drive is used to remove the exit portion of the belt as it "peels" off of the cage at the top of the spiral. In an alternative embodiment, magnets are placed in the rotating cage bars so as to drive a ferrous metal belt or a non-metallic belt with ferrous inserts.

The magnets employed can be of any type of permanent magnet material or electromagnet. In one embodiment, permanent ceramic magnets are used. The magnets may be attached to the belt or drive bar by several methods including insert molding, press fitting, snap fitting, adhesive bonding, and fasteners.

There are several advantages to the type of supplemental magnetic drive spiral conveyor system just described. The design does not require the inducement of high tension into the belt to create necessary driving friction, whereby belt life is increased. With lower belt tension, lighter belt constructions can be used. This results in lower original and replacement belt costs and a lighter spiral cage construction. Problems associated with belt slipping and overdrive are eliminated, resulting in lower maintenance costs.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION

Figure 1:
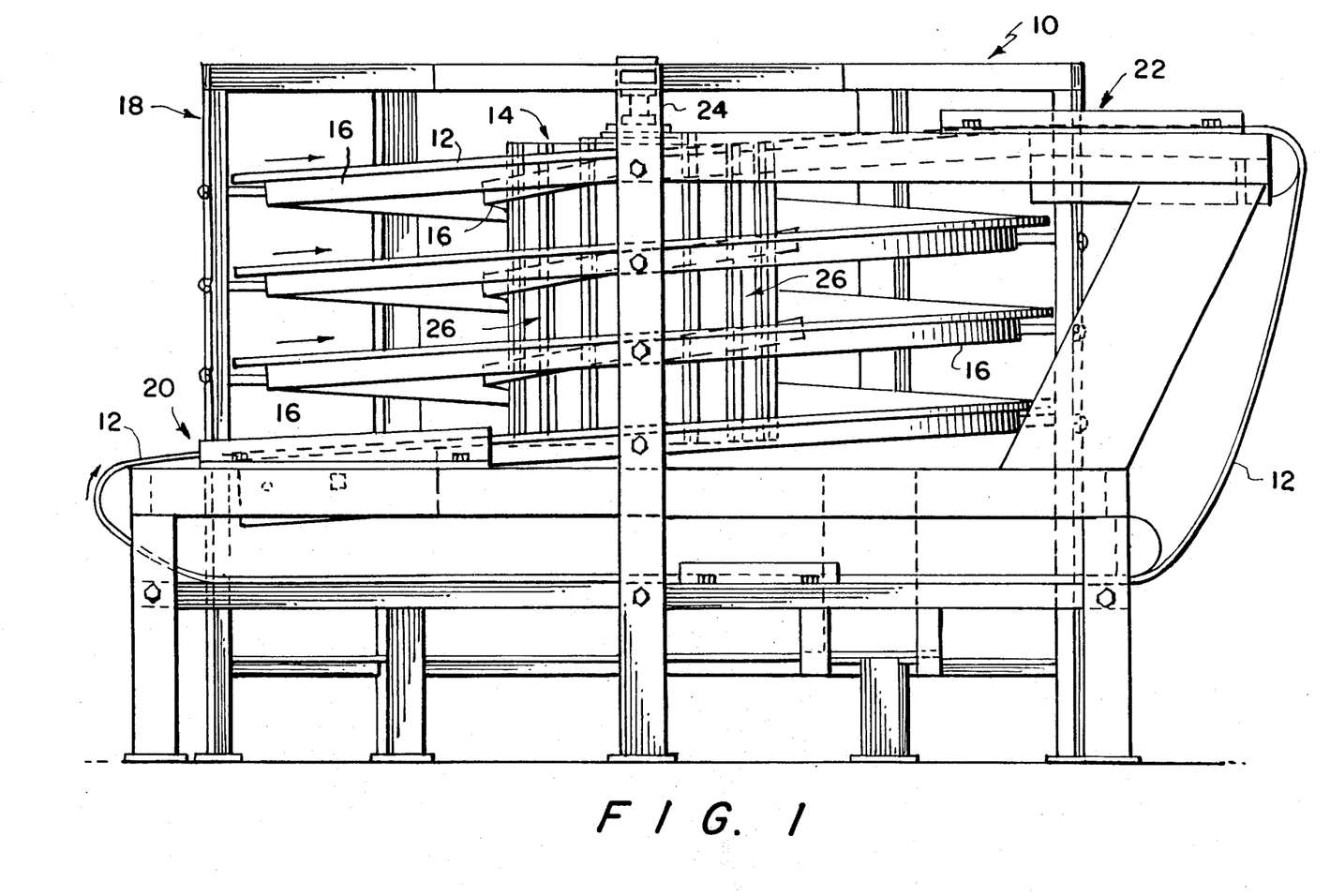
FIG. 1 is a side elevational view of a spiral conveyor system.
Figure 2:
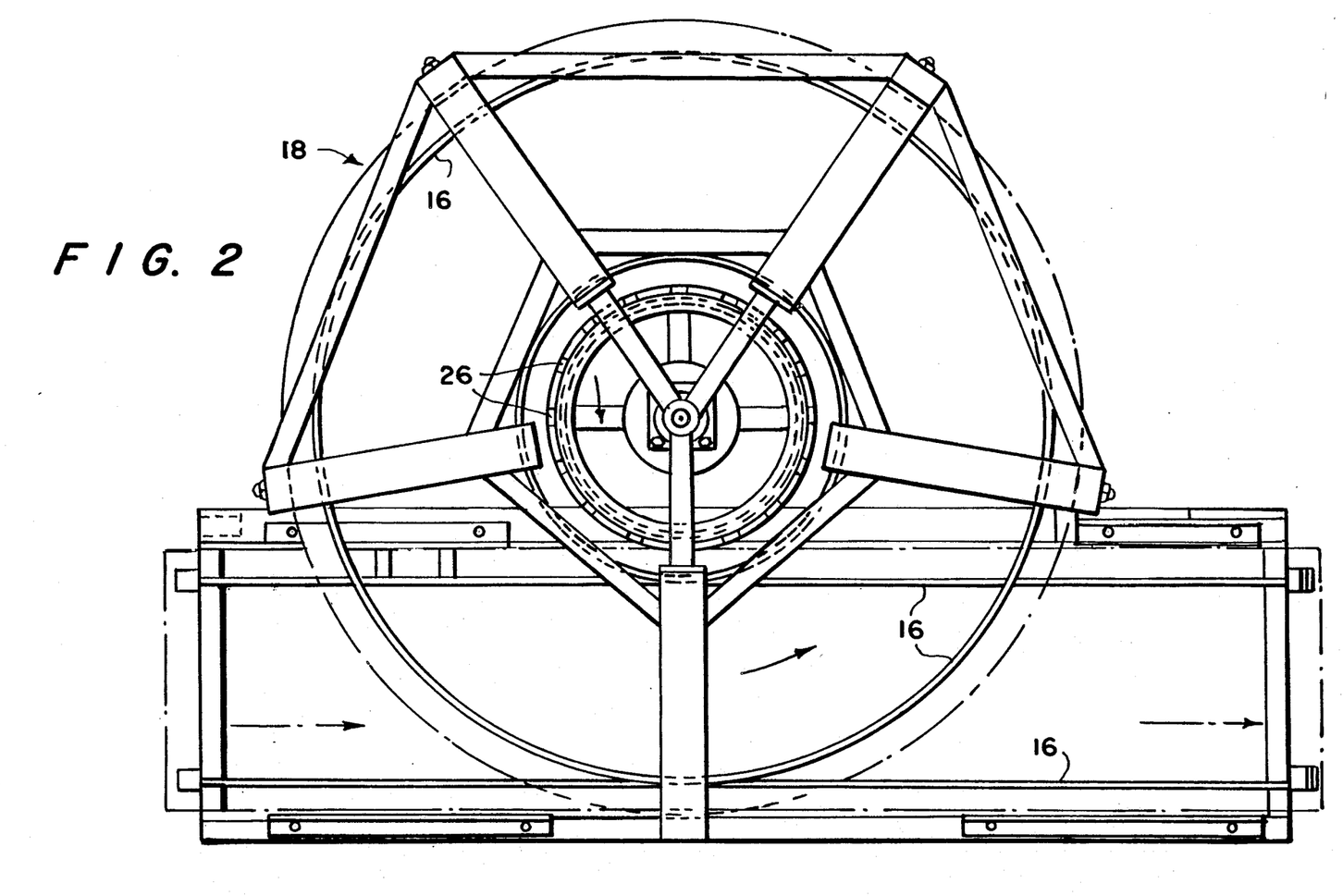
FIG. 2 is a top plan view thereof.

FIGS. 1 and 2 illustrate side and top views, respectively, of a spiral conveyor system 10 utilizing an endless conveyor belt 12. The belt is made of modular links connected together and adapted for to collapse along one edge of the belt and expand along the opposite edge to permit passage of the belt around lateral curves. The belt 12 travels in an endless path which includes a spiral portion. In the spiral portion, the belt 12 is wound about a driving cage 14 in a vertically oriented helix. The belt 12 is supported in a spiral track 16 which also winds around the driving cage 14. The driving cage 14 and spiral track 16 are supported by a frame 18. Although only three loops are shown in FIG. 1, as forming the helix, it should be understood that a conveyor system could be built with a different number of loops. The belt 12 enters the spiral portion at 20 and exits the spiral portion at 22, arrows indicating the direction of travel of the belt 12.

The driving cage 14 rotates about a shaft 24 and is driven by conventional means which are not shown. The driving cage 14 has a plurality of vertically oriented driving bars 26 spaced circumferentially around the cage 14. In a preferred embodiment, the driving bars 26 are made of steel. A conventional secondary drive, not shown, pulls the belt 12 from the spiral portion of cage 14. The secondary drive induces a tension in the spiral belt such that there is frictional contact between the radially inner edge of the belt 12 and the driving cage 14. The driving cage 14 moves faster than the belt 12 whereby it continuously slides past the edge of the belt 12 to achieve a frictional drive. After being pulled from the spiral portion, the belt 12 loops back to the entrance of the spiral portion by the cage drive.

Figure 3:
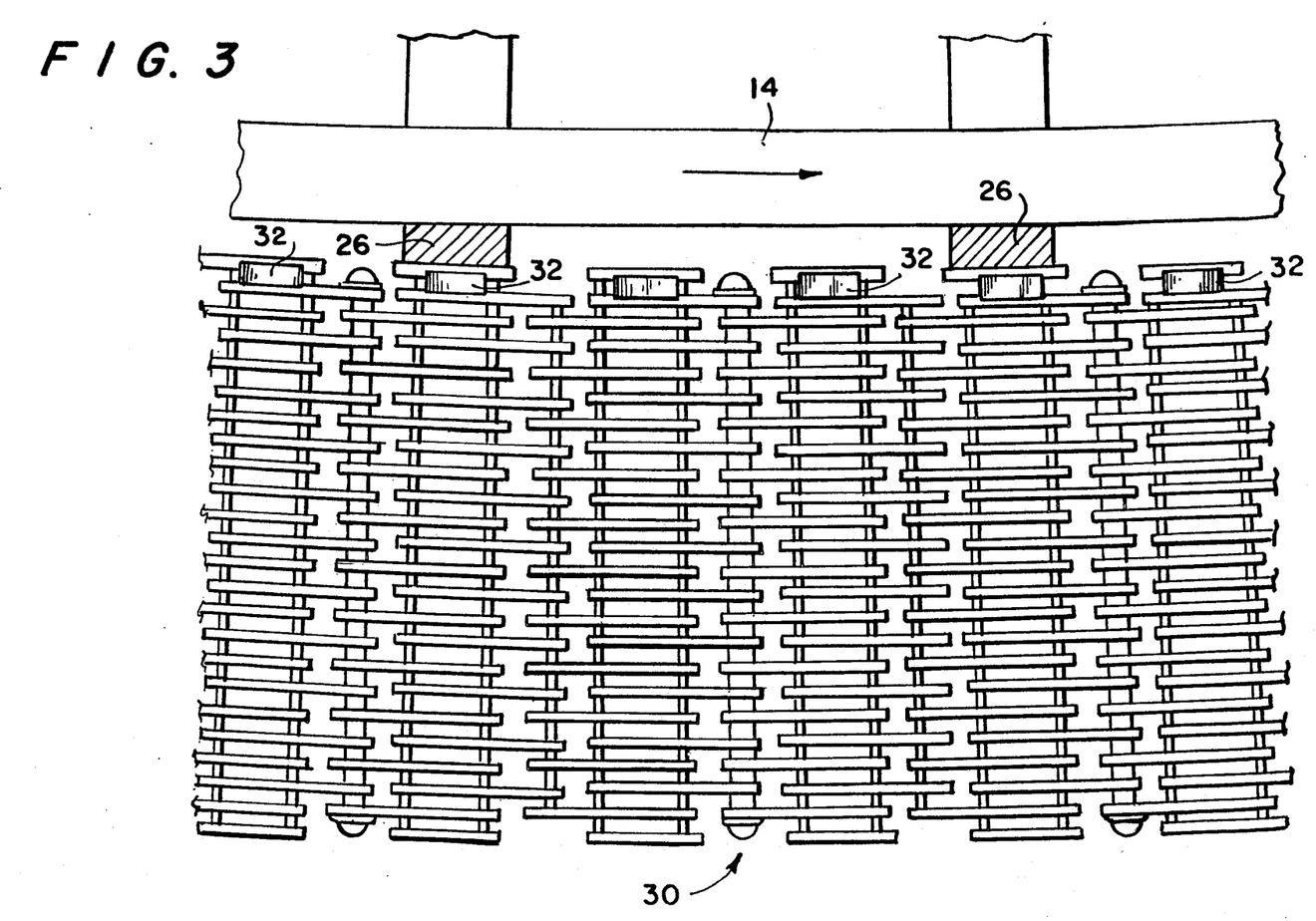
FIG. 3 is a top plan view of a portion of a spiral conveyor system in operative relationship with a modular plastic drive belt having permanent magnets embedded therein.

FIG. 3 shows one embodiment of a magnet-carrying belt 12 arranged in operative relationship with the driving bars 26. The belt 12, described further in U.S. Pat. No. 4,557,374, comprises a plurality of individual plastic modules 28 joined by hinge rods 30. Permanent magnets 32 are embedded in the exposed edge of each module 28 which forms the side of the belt which contacts the driving bars. Since the magnets 32 are attracted to the driving bars 26, the magnetic force between the magnets 32 and the driving bars 26 increases the contact pressure between the belt edge and driving bars 26, thereby increasing drive force without increasing belt edge tension. Thus, the driving force for the belt is provided by a combination of conventional low tension frictional drive system and increased frictional drive contact created by the use of magnets in the belt.

Because the design just described does not require the application of high tension to the belt in order to create increased driving friction, longer belt service life is obtained. With lower belt tension, lighter belt constructions can be used resulting in lower original and replacement belt costs and lighter spiral cage construction. Moreover, problems associated with belt overdrive and the control of belt slippage in varying conditions are reduced, resulting in lower maintenance costs.

Figure 4:
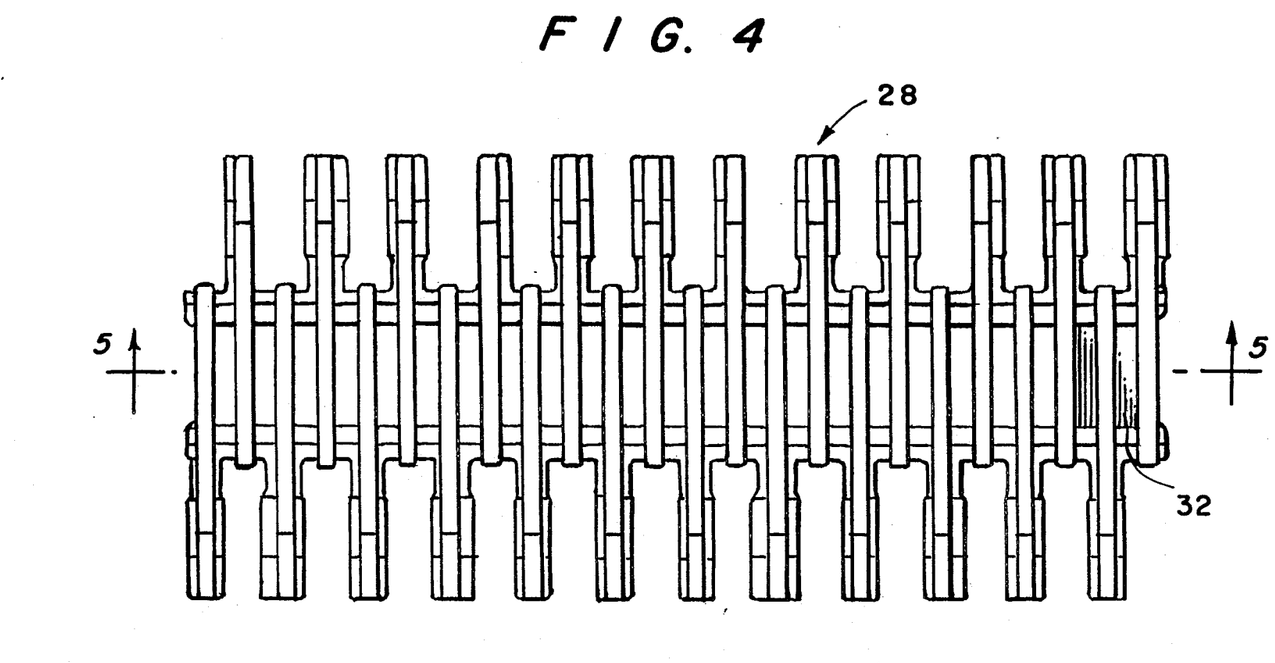
FIG. 4 is a top plan view of a belt module with having a magnet embedded therein.
Figure 5:
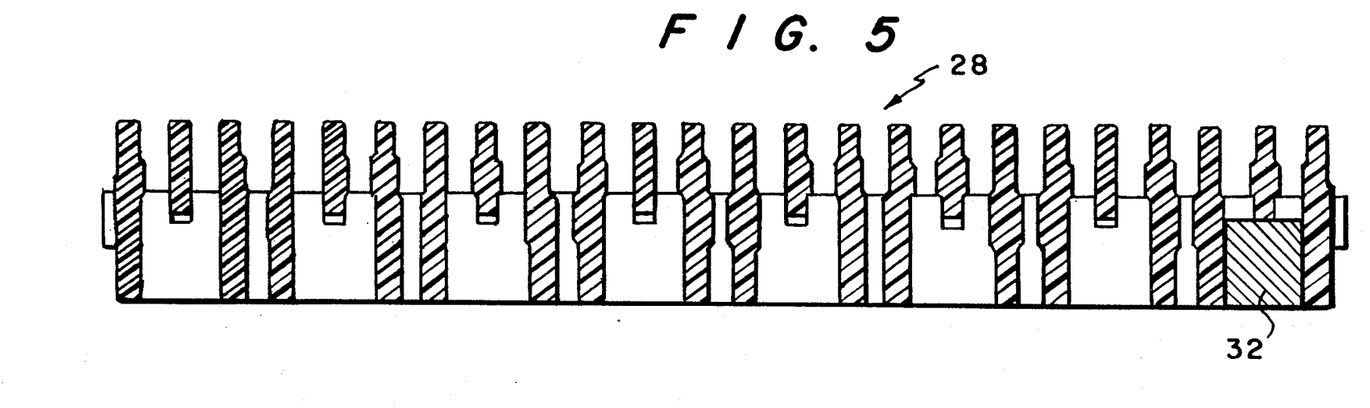
FIG. 5 is a sectional view taken along line 5—5 of FIG. 4.

FIGS. 4 and 5 illustrate an alternative embodiment of a belt module 28 wherein the magnet 32 is located in a cavity in the underside of the module. FIG. 5, in particular, shows the magnet 32 as being press fitted into the cavity. Alternatively, however, the magnet 32 could be adhesively held within the cavity.

Figure 6:
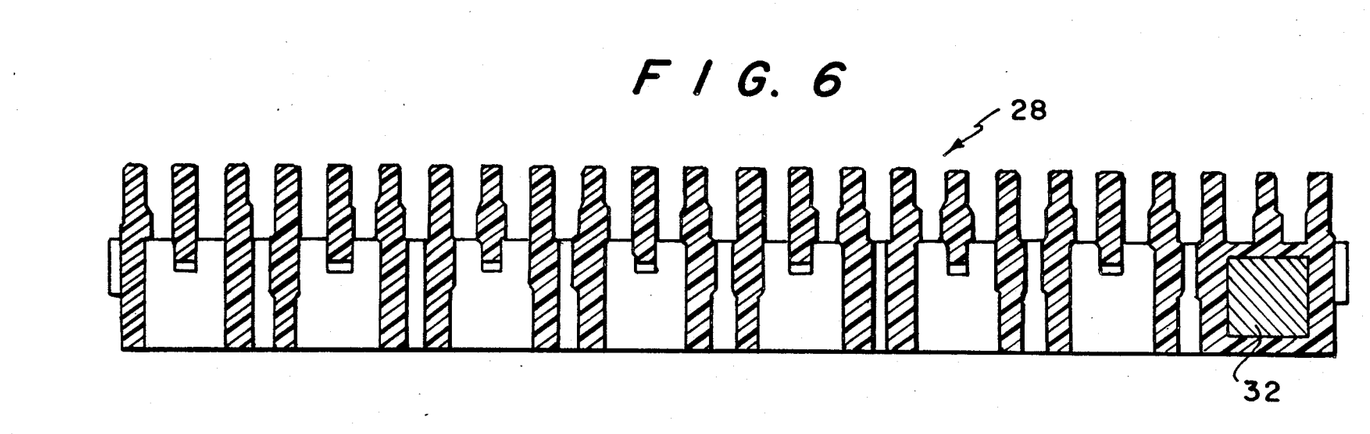
FIG. 6 is an alternative embodiment of the belt module shown in FIG. 5.

FIG. 6 shows an alternative to the module 28 illustrated in FIGS. 4 and 5, the magnet 32 being integrally molded into the belt module 28.

Figures 7, 8:
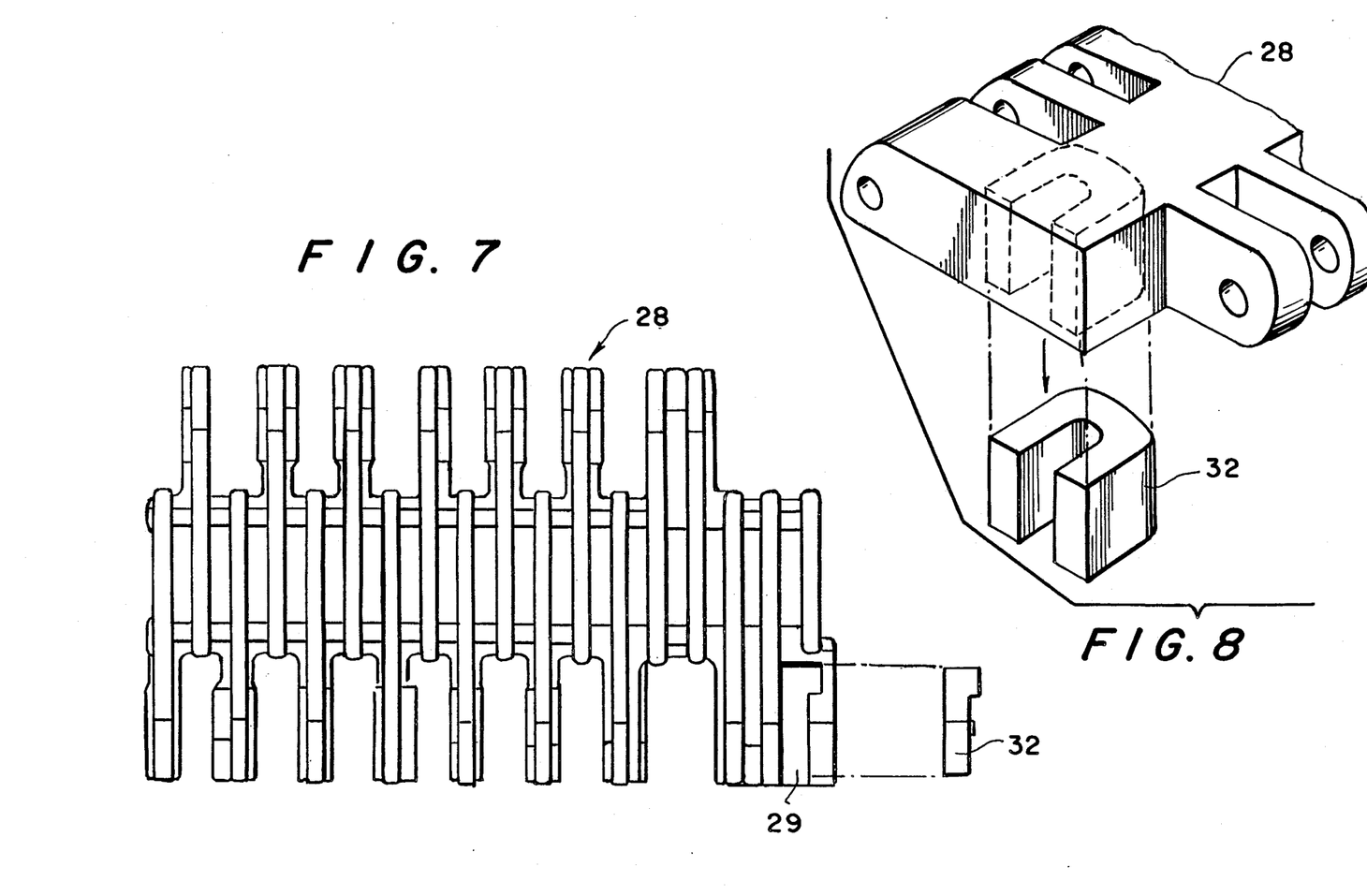
FIG. 7 is a top plan view, partially exploded, of a first alternative embodiment of a belt module having a magnet embedded therein.
FIG. 8 is an exploded perspective view of a position of a second alternative embodiment belt module and horseshoe magnet.

FIG. 7 shows an embodiment of module 28 wherein the magnet 32 is designed to snap-fit into a cavity 29.

FIG. 8 illustrates a module 28 employing a horseshoe-shaped magnet 32.

Figure 9:
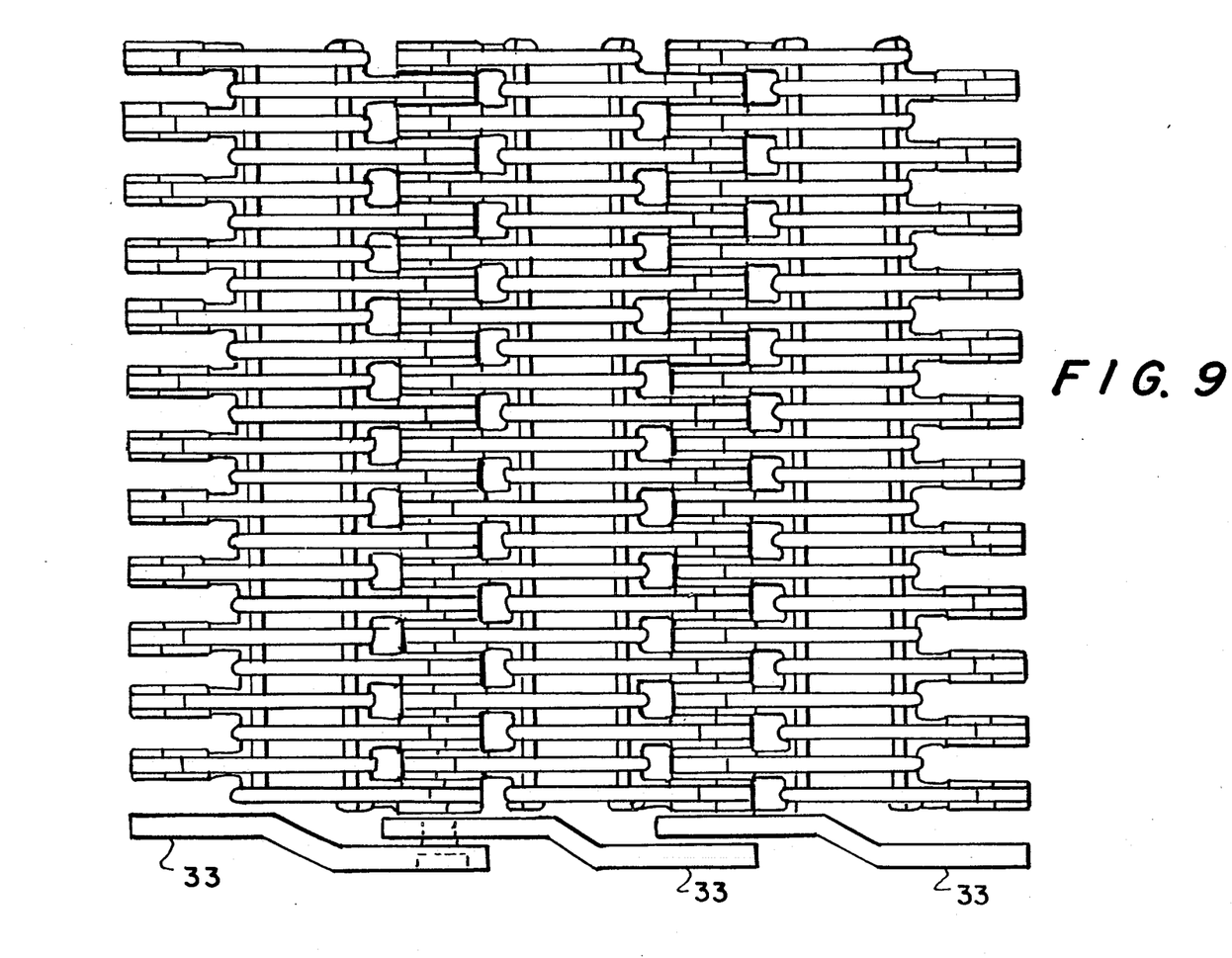
FIG. 9 is a top plan view of a portion of a belt wherein the reinforcing links of the belt are magnets.

FIG. 9 shows a belt 12 wherein reinforcing links 33 secured to the edge of the belt which contacts the driving bars 26 are formed of magnetic material.

Although the embodiments just described include one magnet in each belt module, other embodiments are contemplated wherein not every belt module has a magnet. It is also possible for each belt module to have more than one magnet.

Figure 10:
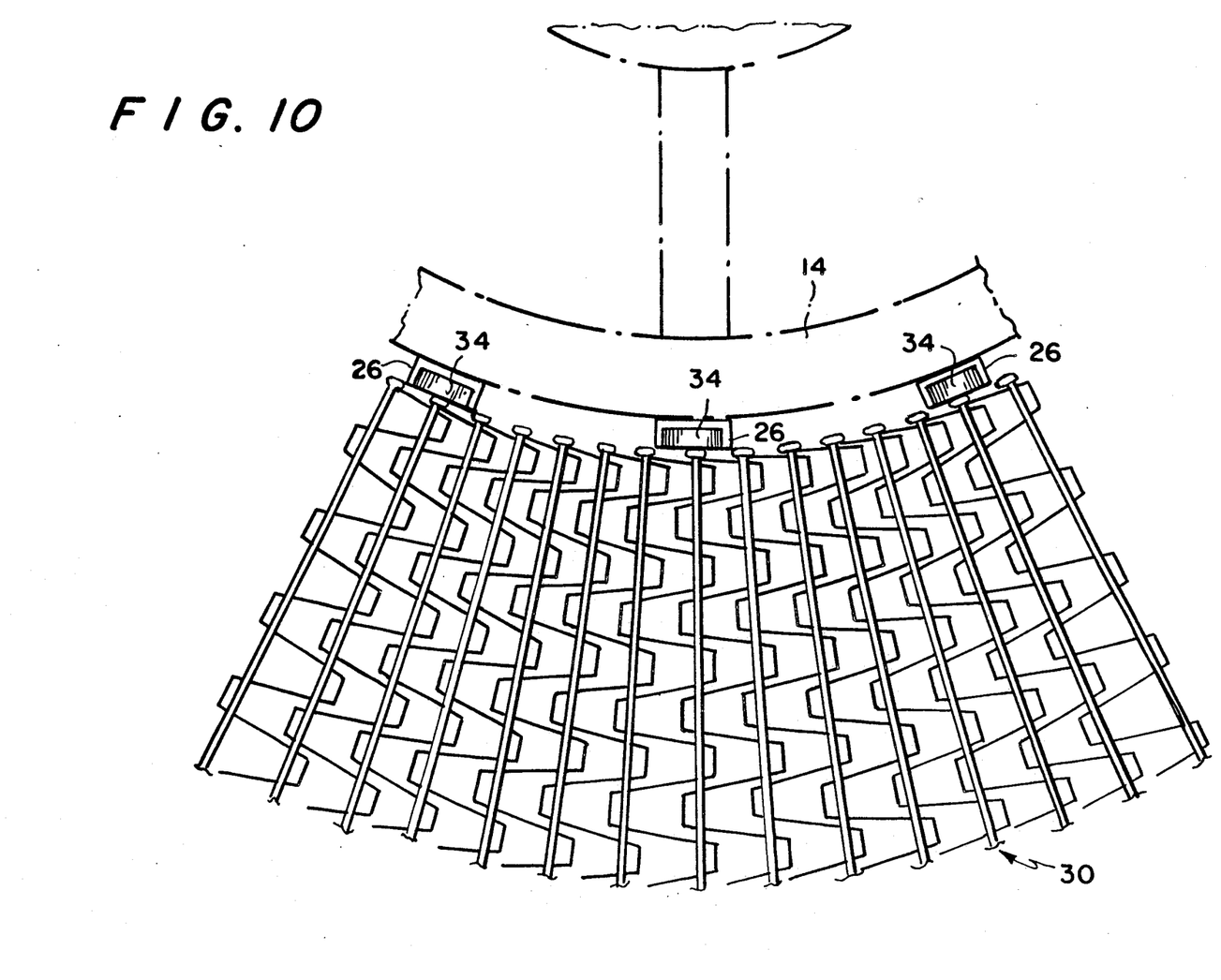
FIG. 10 is a top plan view of a portion of a spiral conveyor in operative relationship with a metallic belt, the conveyor having permanent magnets associated with the drive bars of a rotating cage.

FIG. 10 illustrates an alternative arrangement where permanent magnets 34 are installed in the driving bars 26 and the belt 36 is metallic. The result of such an arrangement is that the frictional contact between the bars and the belt is increased in the same manner as previously discussed.

Figure 11:
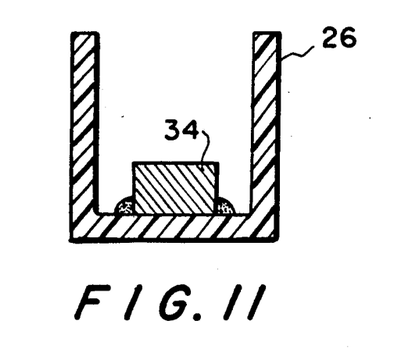
FIG. 11 is an end view of a first embodiment of a drive bar and associated magnet.
Figure 12:
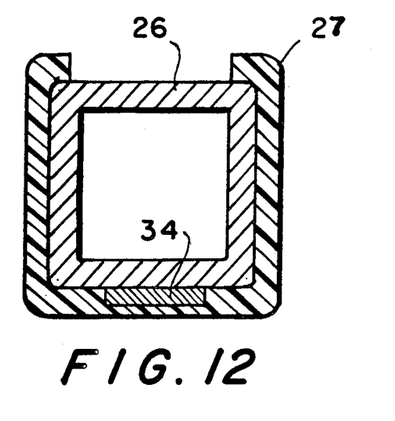
FIG. 12 is a sectional view of an alternative embodiment of a drive bar and associated magnet.
Figure 13:
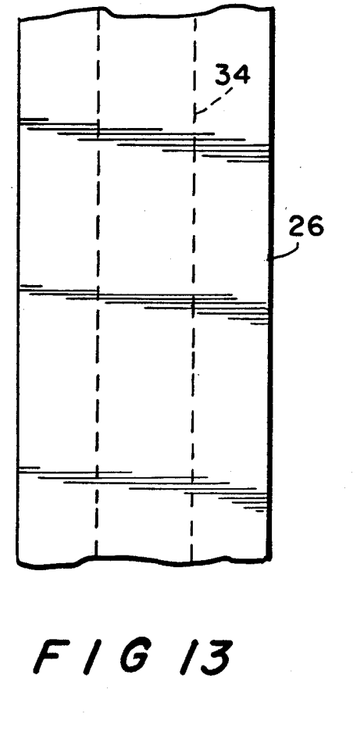
FIG. 13 is a fragmented view showing a drive bar in association with a continuous strip magnet.
Figure 14:
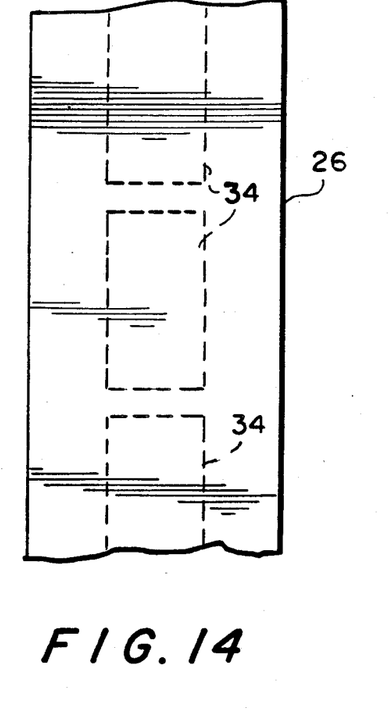
FIG. 14 is a fragmented view showing a drive bar in association with discrete magnets.

FIG. 11 shows a cross section of one embodiment of a magnet-carrying drive bar 26 in which the magnet 34 is bonded or fastened to the inside of the drive bar 26. FIG. 12 shows a cross section of an alternative embodiment where the drive bar 26 is partially enclosed by a plastic cap 27 in which the magnet 34 is placed. FIG. 13 shows how a magnet 34 attached to the drive bar 26 can be one formed in a continuous strip, while FIG. 14 shows a drive bar 26 with several discrete magnets 34 attached.

In an alternative embodiment wherein magnets are installed in the drive bars, any of the previously discussed embodiments of plastic belt modules 28 can have steel, or some other magnetizable material take the place of the magnets. It is also possible to install magnets in both the drive bars 26 and the belt modules 28 provided the polarities are appropriately arranged.

The magnets used in carrying out the present invention can be permanent magnets or electromagnets. In one embodiment, ceramic magnets, or magnets made of ALNICO are used. In a preferred embodiment, magnets having a force of 1–10 lbs. holding strength at a gap of 0.1–0.2 inches are used. However, the magnetic strength necessary will depend on the application. The magnets can be of a bar or strip type, "U", channel or horseshoe-shaped, or other configurations.

While the invention has been described in accordance with what is presently conceived to be the most practical and preferred embodiments, it is to be understood that the invention is not limited to the disclosed embodiments but on the contrary, is intended to cover various modifications and equivalent arrangements included within the spirit and the scope of the appended claims, which scope is to be accorded the broadest interpretation of such claims so as to encompass all such equivalent structures.

I claim:

1. A conveyor system comprising:
   an endless belt having a plurality of links connected together and adapted to permit passage of the belt around lateral curves;
   means to support said belt for passage through an endless path including a spiral portion extending through a plurality of vertically spaced loops with the belt curved laterally in each of the loops, an approach portion leading into a first loop at one end of the spiral portion and an exit portion leading away from a last loop at the other end of the spiral portion;
   a driving means having drive surfaces engaging the belt in a frictional driving relationship along a radially inner edge of the belt in each of the loops; and
   means for providing a magnetic force between the driving means and the belt such that the frictional contact between the two is increased.

2. The conveyor system of claim 1 wherein the means for providing a magnetic force comprises at least one magnet attached to one of the driving means and the belt.

3. The conveyor system of claim 2 wherein the means for providing a magnetic force comprises at least one magnetizable element attached to the other of the driving means and the belt.

4. The conveyor system of claim 2 wherein the magnet is attached to the belt.

5. The conveyor system of claim 2 wherein the magnet is attached to the driving means.

6. The conveyor system of claim 2 wherein the magnet is a permanent magnet.

7. The conveyor system of claim 2 wherein the magnet is an electromagnet.

8. The conveyor system of claim 2 wherein the magnet is attached by molding the magnets in place.

9. The conveyor system of claim 2 wherein the magnet is attached to the belt by press fitting into a cavity.

10. The conveyor system of claim 2 wherein the magnet is attached by snap-fitting.

11. The conveyor of claim 2 wherein the magnet is attached by an adhesive.

12. The conveyor system of claim 2 wherein the magnet is attached by at least one fastener.

13. The conveyor system of claim 2 wherein the magnet is attached by clamping means.

14. The conveyor system of claim 3 wherein the magnetizable element is attached by molding the magnetizable element in place.

15. The conveyor system of claim 3 wherein the magnetizable element is attached by press fitting into a cavity.

16. The conveyor system of claim 3 wherein the magnetizable element is attached by snap-fitting.

17. The conveyor system of claim 3 wherein the magnetizable element is attached by an adhesive.

18. The conveyor system of claim 3 wherein the magnetizable element is attached by at least one screw.

19. The conveyor system of claim 3 wherein the magnetizable element is attached by clamping means.

20. The conveyor system of claim 1 wherein the means for providing a magnetic force comprises at least one magnet in one of the driving means and the belt.

21. The conveyor system of claim 20 wherein the means for providing a magnetic force comprises at least one magnetizable element in the other of the driving means and the belt.

22. The conveyor system of claim 1 wherein the driving means comprises:
    a cylindrical cage rotatable about a vertical axis extending through the spiral portion of the belt and having driving surfaces that engage the belt.

23. The conveyor system of claim 22 wherein the driving surfaces comprise vertically-oriented driving bars.

* * * * *